United States Patent
Xu (10) Patent No.: US 7,785,023 B1
(45) Date of Patent: Aug. 31, 2010

(54) MINIATURE CAMERA LENS SYSTEM

(75) Inventor: Jing Xu, Irvine, CA (US)

(73) Assignee: Tessera MEMS Technologies, Inc., Arcadia, CA (US)

(*) Notice: Subject to any disclaimer, the term of this patent is extended or adjusted under 35 U.S.C. 154(b) by 1038 days.

(21) Appl. No.: 11/505,660

(22) Filed: Aug. 16, 2006

(51) Int. Cl.
*G03B 17/00* (2006.01)
*G02B 9/34* (2006.01)
*H04N 5/225* (2006.01)

(52) U.S. Cl. .................. 396/439; 359/779; 348/376
(58) Field of Classification Search .................. 396/439
See application file for complete search history.

(56) References Cited

U.S. PATENT DOCUMENTS 6,900,948 B2  5/2005  Sato .......................... 359/715
2004/0228009 A1* 11/2004 Kamo et al. ................ 359/774
2004/0240080 A1* 12/2004 Matsui et al. ............... 359/754

* cited by examiner

*Primary Examiner*—Melissa J Koval
(74) *Attorney, Agent, or Firm*—Haynes and Boone, LLP (57) ABSTRACT

A lens system for a miniature camera includes an imager and four cylindrical lenses disposed concentrically on an optical axis of the lens system. The lenses include, in order from a front end of the lens system to a back end thereof, a first lens, a second lens, a third lens and a fourth lens. The first lens has a positive power and aspheric front and back surfaces, the second lens has a negative power and aspheric front and back surfaces, the third lens is made of glass, has a positive power, a plano front surface and a spherical convex back surface, and the fourth lens has a negative power and aspheric front and back surfaces.

9 Claims, 11 Drawing Sheets

|  | Surface # | Type | Radius (mm) | Thickness (mm) | Clear Aperture Diameter (mm) | Nd | Vd |
|---|---|---|---|---|---|---|---|
| Stop | 1 | STANDARD | Infinity | 0.000 | 1.350 |  |  |
| Lens 15 | 2 | EVENASPH | 2.373 | 0.740 | 1.475 | 1.5312 | 56.04 |
|  | 3 | EVENASPH | -2.462 | 0.116 | 1.713 |  |  |
| Lens 16 | 4 | EVENASPH | -28.703 | 0.427 | 1.803 | 1.5855 | 29.9 |
|  | 5 | EVENASPH | 1.588 | 0.493 | 1.980 |  |  |
| Lens 17 | 6 | STANDARD | Infinity | 0.810 | 2.335 | 1.754 | 52.43 |
|  | 7 | STANDARD | -3.074 | 0.534 | 2.714 |  |  |
| Lens 18 | 8 | EVENASPH | 1.724 | 0.448 | 3.147 | 1.5312 | 56.04 |
|  | 9 | EVENASPH | 1.171 | 0.790 | 3.790 |  |  |
| Window | 10 | STANDARD | Infinity | 0.300 | 4.316 | 1.52 | 60 |
|  | 11 | STANDARD | Infinity | 0.300 | 4.439 |  |  |
| Imager | 12 | STANDARD | Infinity | 0.000 | 4.651 |  |  |

FIG. 4

| Surface 2 |  |
|---|---|
|  | Nominal Value |
| r (mm) | 2.373 |
| k | -0.739132847 |
| A4 | -3.41445616E-02 |
| A6 | 3.18239649E-02 |
| A8 | -1.53084320E-01 |
| A10 | 9.19625122E-02 |
| A12 | 1.25783051E-02 |
| A14 | 2.51716581E-02 |
| A16 | 1.13450707E-01 |
| Surface 3 |  |
| r (mm) | -2.462 |
| k | -20.94707473 |
| A4 | -1.52591870E-01 |
| A6 | 2.02714475E-01 |
| A8 | -2.09412003E-01 |
| A10 | 2.67831047E-02 |
| A12 | 1.63878680E-03 |
| A14 | 7.15298347E-02 |
| A16 | 1.45959936E-03 |

FIG. 5

| Surface 4 | |
|---|---:|
| | Nominal Value |
| r (mm) | -28.703 |
| k | -1255.788464 |
| A4 | -9.17575307E-02 |
| A6 | 2.02934978E-01 |
| A8 | -1.93618444E-01 |
| A10 | 4.64453485E-02 |
| A12 | 2.28650102E-02 |
| A14 | 9.37820659E-03 |
| A16 | -3.52164846E-03 |
| Surface 5 | |
| r (mm) | 1.588 |
| k | -6.974075429 |
| A4 | 4.04172792E-02 |
| A6 | 5.44884438E-02 |
| A8 | -5.56345987E-02 |
| A10 | 1.56459843E-02 |
| A12 | -1.32123488E-03 |
| A14 | 4.17359200E-03 |
| A16 | -1.74801165E-03 |

FIG. 6

| Surface 8 | |
|---|---:|
| | Nominal Value |
| r (mm) | 1.724 |
| k | -9.035174874 |
| A4 | -7.26286741E-02 |
| A6 | -2.30108569E-02 |
| A8 | 1.39321866E-02 |
| A10 | -2.44018593E-03 |
| A12 | -1.22906373E-04 |
| A14 | -1.44232340E-05 |
| A16 | 6.73328182E-06 |
| Surface 9 | |
| r (mm) | 1.171 |
| k | -4.241969017 |
| A4 | -7.86008572E-02 |
| A6 | 1.07837461E-02 |
| A8 | -1.25434850E-03 |
| A10 | -1.24200241E-04 |
| A12 | 4.40580607E-05 |
| A14 | -2.56805142E-06 |
| A16 | -9.02063779E-07 |

|  | Surface # | Type | Radius (mm) | Thickness (mm) | Clear Aperture Diameter (mm) | Nd | Vd |
|---|---|---|---|---|---|---|---|
| Stop | 1 | STANDARD | Infinity | 0.000 | 1.670 | | |
| Lens 15 | 2 | EVENASPH | 2.689 | 0.890 | 1.860 | 1.5312 | 56.04 |
| | 3 | EVENASPH | -4.226 | 0.112 | 2.114 | | |
| Lens 16 | 4 | EVENASPH | 9.501 | 0.428 | 2.221 | 1.5855 | 29.9 |
| | 5 | EVENASPH | 1.593 | 0.513 | 2.435 | | |
| Lens 17 | 6 | STANDARD | Infinity | 0.772 | 2.693 | 1.754 | 52.43 |
| | 7 | STANDARD | -3.895 | 1.183 | 3.063 | | |
| Lens 18 | 8 | EVENASPH | 1.840 | 0.435 | 4.114 | 1.5312 | 56.04 |
| | 9 | EVENASPH | 1.412 | 1.047 | 4.768 | | |
| Window | 10 | STANDARD | Infinity | 0.300 | 5.526 | 1.52 | 60 |
| | 11 | STANDARD | Infinity | 0.300 | 5.650 | | |
| Imager | 12 | STANDARD | Infinity | 0.000 | 5.912 | | |

FIG. 12

| Surface 2 | |
|---|---|
| | Nominal Value |
| r (mm) | 2.689 |
| k | -0.619545923 |
| A4 | -2.49035091E-02 |
| A6 | 5.87773459E-02 |
| A8 | -1.03402457E-01 |
| A10 | 5.44653453E-02 |
| A12 | 1.54521745E-02 |
| A14 | -2.25105644E-03 |
| A16 | -8.67406064E-03 |
| Surface 3 | |
| r (mm) | -4.226 |
| k | 8.294584287 |
| A4 | -3.12334523E-02 |
| A6 | 1.31587362E-01 |
| A8 | -1.19989147E-01 |
| A10 | 4.00080090E-02 |
| A12 | 1.75511538E-03 |
| A14 | 1.88221137E-03 |
| A16 | -1.08650524E-03 |

FIG. 13

| Surface 4 | |
|---|---|
| | Nominal Value |
| r (mm) | 9.501 |
| k | 35.14991747 |
| A4 | -1.80097502E-01 |
| A6 | 2.69701420E-01 |
| A8 | -1.98522438E-01 |
| A10 | 4.82793686E-02 |
| A12 | 7.16973689E-03 |
| A14 | 5.22873785E-03 |
| A16 | -5.22703880E-03 |
| Surface 5 | |
| r (mm) | 1.593 |
| k | -6.720395915 |
| A4 | 9.74511373E-03 |
| A6 | 4.14802681E-02 |
| A8 | -2.96419187E-02 |
| A10 | 6.20052357E-03 |
| A12 | 9.15806521E-04 |
| A14 | 3.01116260E-04 |
| A16 | -4.29169219E-04 |

FIG. 14

| Surface 8 | |
|---|---:|
| | Nominal Value |
| r (mm) | 1.840 |
| k | -4.466443402 |
| A4 | -4.72453646E-02 |
| A6 | -3.19482522E-03 |
| A8 | 1.72972237E-03 |
| A10 | -2.21759088E-04 |
| A12 | -1.06746581E-06 |
| A14 | -3.52127518E-07 |
| A16 | 8.83174872E-08 |
| Surface 9 | |
| r (mm) | 1.412 |
| k | -3.263710119 |
| A4 | -4.54393962E-02 |
| A6 | 3.40009771E-03 |
| A8 | -1.48720743E-04 |
| A10 | -2.62435335E-05 |
| A12 | 1.22756895E-06 |
| A14 | 1.09895571E-07 |
| A16 | -3.73104482E-08 |

MINIATURE CAMERA LENS SYSTEM

TECHNICAL FIELD

The present invention relates generally to optics. The present invention relates more particularly to methods and systems for providing optics for miniature cameras, such as those used in cellular telephones and the like.

BACKGROUND

Miniature cameras are well known. Miniature cameras are widely used in contemporary cellular telephones. They are also used in other personal electronic devices, such as laptop computers and personal digital assistants (PDAs). Miniature cameras can additionally be used as stand alone devices for such applications as security and surveillance It is generally desirable to minimize the size of a camera used in cellular telephones and the like. This is due to the ongoing reduction in size of the cellular telephone itself. It is also due to the desire to provide other features. All of the features of a contemporary cellular telephone, including the camera, compete for space within the cellular telephone.

Reducing the size of a camera for a cellular telephone includes reducing the size of the optics for the camera. Indeed, the optics can contribute substantially to the overall size of the camera. Thus, reducing the size of the optics can have a substantial impact upon the overall size of the camera.

The size of the optics can be reduced by reducing the length and/or the diameter of the optics. One prior art attempt at reducing the length of the optics has been to reduce the number of optical elements. Generally, four lenses are provided in miniature cameras for cellular telephones and the like. By reducing the number of lenses to three, the length of the optics can be correspondingly reduced.

However, four lenses are necessary to limit distortion, such as pincushion and barrel. Four lenses are also necessary in order to provide desired resolution, such as that measured by the modulation transfer function (MTF).

Reducing the diameter of the optics requires reducing the size of the clear aperture of the lens or lenses thereof. However, reducing the size of the clear aperture while minimizing any adverse impact upon distortion and/or resolution is difficult.

Thus, although such contemporary attempts at reducing the size of miniature camera optics have proven somewhat useful for their intended purposes, these attempts possess inherent deficiencies which detract from their overall effectiveness and desirability. In view of these deficiencies, it is desirable to provide optics for miniature cameras, wherein the optics are reduced in size so as to facilitate use of the miniature cameras in cellular telephones and the like.

BRIEF SUMMARY

Systems and methods are disclosed herein to provide a lens system for a miniature camera. The lens system can be used in a personal electronic device, such as a cellular telephone. Size is reduced while mitigating distortion and maintaining desirable resolution.

For example, in accordance with an exemplary embodiment of the present invention, a lens system comprises a plurality of lenses that are configured such that the lens having the smallest diameter is the first lens.

In accordance with an exemplary embodiment of the present invention, the lens system can comprise a plurality of lenses that are configured such that the diameter of the lenses tends to get larger from front to back. More particularly, each successive lens can have a larger diameter than the preceding lens. Thus, the diameter of the lens system can progress from a small diameter that is desirable for the entrance window of the personal electronic device to a larger diameter that is appropriate for the imager of the camera.

The entrance window defines the outermost optical surface of the camera and thus defines the part of the camera that user sees. It can be either a lens or merely a window (which has no curved surfaces). It also uses some of the surface area of the personal electronic device, thus making it desirable to minimize the size of the entrance window so as to minimize the amount the surface area used and thereby make more of the surface area available for other items such as keypads, controls, displays and aesthetic features.

The present invention facilitates the use of four lenses in a lens system having reduced size. The use of four lenses provides substantial advantages with respect to distortion and resolution, particularly as compared to a lens system having only three lenses.

According to an exemplary embodiment of the present invention, one of the lenses can have one plano surface. For example, the third lens can be a plano-convex lens. As those skilled in the art will appreciate, lenses having one plano surface are generally less costly than lenses having no plano surfaces.

According to an exemplary embodiment, the present invention comprises a method for focusing a miniature camera, wherein the method comprises transmitting light through a first lens; transmitting light from the first lens through a second lens, the second lens having a larger diameter than the first lens; transmitting light from the second lens through a third lens, the third lens having a larger diameter than the second lens; and transmitting light from the third lens through a fourth lens, the fourth lens having a larger diameter than the third lens.

According to an exemplary embodiment, the present invention comprises a method of making a miniature camera, wherein the method comprises providing an imager and attaching a lens system proximate the imager. The lens system can comprise a plurality of lenses configured such that a lens having the smallest diameter is the first lens.

By making the first lens of the lens system the smallest lens thereof, the use of a smaller entrance window for the personal electronic device is facilitated. By using four lenses (as opposed to using three lenses, for example) distortion is mitigated and resolution is enhanced.

This invention will be more fully understood in conjunction with the following detailed description taken together with the following drawings.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

A method and system for reducing the size of a miniature camera are disclosed. The method and system are suitable for use in miniature cameras commonly used in personal electronic devices, such as cellular telephones, personal digital assistants (PDAs), laptop computers, notebook computers, and pocket personal computers (pocket PCs).

The present invention facilitates the construction of a lens system having a smaller clear aperture than contemporary lens systems. As those skilled in the art will appreciate, clear aperture is also known as free aperture or objective aperture and can be defined as the opening in the mount of an optical system or its components that restricts the extent of the bundle of rays incident on a given surface. It is necessary to reduce the free aperture of a lens system in order to decrease the diameter of the lens system.

Further, the lens system is configured such that smallest lens is the first lens. The first lens can be defined herein as the first lens to receive light, the second lens can be defined as the second lens to receive light, and so on.

By reducing the size of the clear aperture, the lens system can be configured so as to fit within a smaller lens barrel. Of course, the use of a smaller lens barrel facilitates the construction of a smaller miniature camera. By placing the smallest lens first, the use of a smaller entrance window (the window through which light enters the camera) is facilitated. Thus, according to one or more embodiments of the present invention, the construction of a smaller miniature camera that uses a smaller entrance window is facilitated, while maintaining desired distortion and resolution characteristics.

Figure 1:
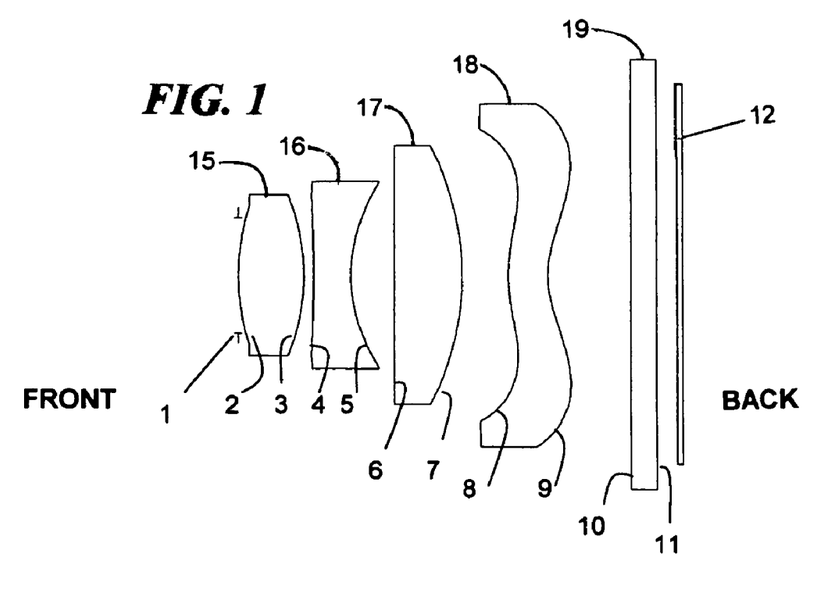
FIG. 1 is a semi-schematic side view showing a lens system having the smallest lens first (in the front) and having lenses that increase in diameter from the front to the back, according to an exemplary embodiment of the present invention.

Referring now to FIG. 1, a semi-schematic side view of a lens system constructed according to an exemplary embodiment of the present invention is shown. The lens system comprises a first lens 15, a second lens 16, a third lens 17, and a fourth lens 18. The first lens 15 can be the smallest lens (has the smallest diameter). The second lens 16 can be the next largest lens. The third lens 17 can be the next largest lens. The fourth lens 18 can be the largest lens. Exit window 19 can be larger than the fourth lens 18. The lens system focuses an image upon an imager 12.

The first lens can function as an entrance window. Alternatively, a separate entrance window, such as an entrance window having plano-plano surfaces, can be provided. In either instance, making the first lens 15 the smallest lens of the lens system facilitates a desirable reduction in the size of the entrance window.

Two exemplary embodiments of the present invention are discussed in detail below. Each of the two embodiments is a particular configuration of the lens system shown in FIG. 1. That is, each of the two embodiments utilizes the general configuration shown in FIG. 1, but has particular values for parameters relating to the lenses, such as thicknesses, radii, clear aperture, etc.

The first embodiment is discussed with reference to FIGS. 3-10 and is suitable for use with cameras having ¼ inch, two or three megapixel pixel CMOS or CCD imagers, for example. The second embodiment is discussed with reference to FIGS. 11-18 and is suitable for use with cameras having ⅓.2 inch, two or three megapixel pixel CMOS or CCD imagers, for example. Both exemplary embodiments are suitable for use in personal electronic devices, such as cellular telephone phones.

The numbers (1-11) of the surfaces shown in FIG. 1 correspond to the numbers of the surfaces listed in the tables of FIGS. 3-6 (for the first exemplary embodiment of the present invention) and FIGS. 11-14 (for the second exemplary embodiment of the present invention)

Both exemplary embodiments of the present invention mitigate the dimensions of lens not only in Z height (optical path length), but also the final diameters of lens barrels. This is accomplished while maintaining the desired optical performance (lack of distortion and desired resolution).

According to these two exemplary embodiments, the lens system comprises three plastic or glass aspheric lenses and one glass spherical lens configured so as to provide desired optical performance with objective focusing distances from 10 cm to infinity. The maximum clear aperture for both lens systems is reduced substantially via the disclosed geometric configurations of the four lenses in each lens system. The maximum clear aperture for the first exemplary embodiment can be reduced to less than 3.8 mm in diameter, so that the final lens barrel diameter can be only 5 mm diameter while the total optical path length (from the vertex of first lens surface to the imager) can be less than 5.15 mm at 10 cm object focusing. For the second exemplary embodiment, the maximum clear aperture can be less than 4.8 mm in diameter, so that this lens system can fit into a lens barrel with diameter of 6 mm. In this instance, total optical path length can be less than 6.25 mm at 10 cm object focusing.

The optical performance of the first exemplary embodiment of the present invention is shown in the charts of FIGS. 7-11. The optical performance over the ¼ inch imager field is: MTF larger than 38% at spatial frequency of 115 cy/mm; distortion less than 0.5% at infinity object focusing; MTF larger than 28% at spatial frequency of 115 cy/mm; and distortion less than 1% at 10 cm object focusing.

Similarly, the optical performance of the second exemplary embodiment of the present invention is shown in the charts of FIGS. 15-18. The optical performance over the ⅓.2 inch imager field is: MTF larger than 39% at spatial frequency of 115 cy/mm; distortion less than 1.04% at infinity object focusing; MTF larger than 40% at spatial frequency of 115 cy/mm; and distortion less than 1% at 10 cm object focusing.

Contemporary attempts at reducing the maximum clear apertures of lens systems which have four lenses have not been successful. Such reduction in the clear aperture is necessary so that the lens system can fit into a 5 mm diameter lens barrel for a ¼ inch imager and a 6 mm diameter lens barrel for ⅓.2 inch imager.

In an attempt to reduce the maximum clear aperture, some contemporary approaches use only three plastic aspheric lenses. However, such contemporary approaches result in worsened optical performance, i.e., worsened distortion and/or resolution.

By way of contrast, one or more embodiments of the present invention maintain the desired four lens structure, and thus maintain desired optical performance, while providing reduced dimensions. The method for maintaining desired optical performance while reducing dimensions is discussed in detail below.

Figure 2:
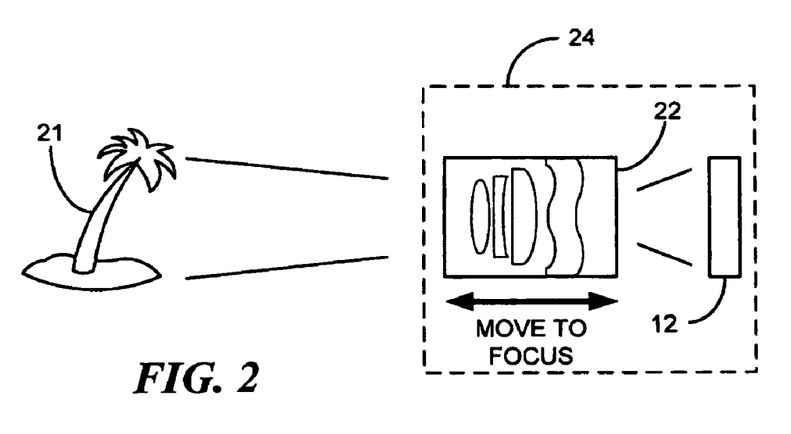
FIG. 2 is a semi-schematic illustration of a digital camera comprising the lens system of FIG. 1.
Figure 3:
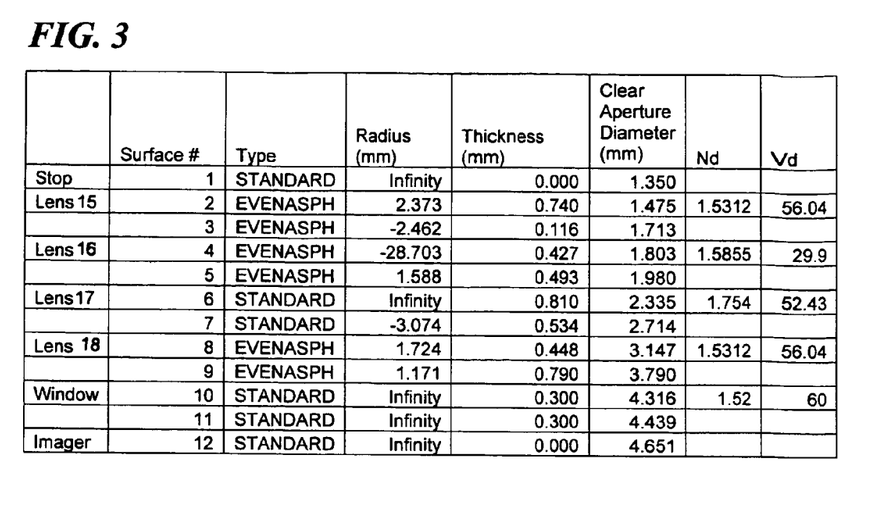
FIG. 3 is a table of lens parameters associated with the lenses of FIG. 1, according to a first exemplary embodiment of the present invention.
Figure 4:
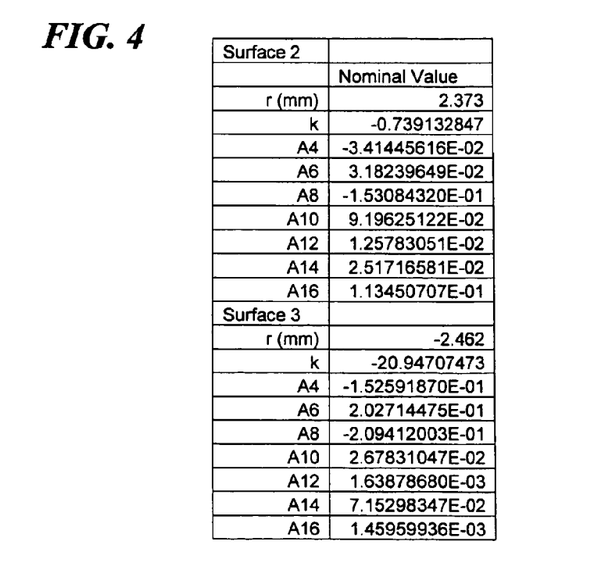
FIG. 4 is a table of nominal values for parameters associated with the first lens of FIG. 1, according to the first exemplary embodiment of the present invention.
Figure 5:
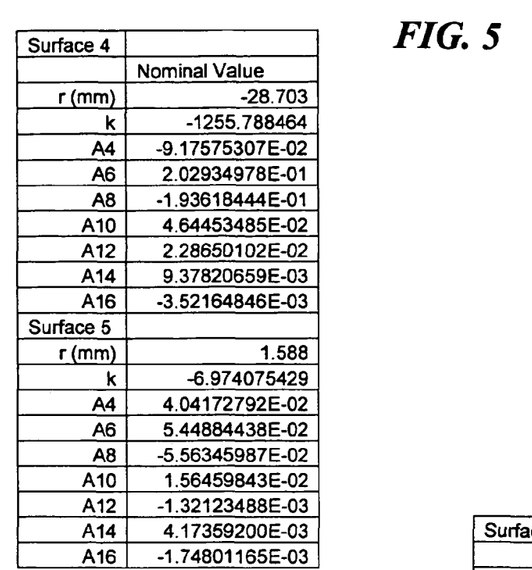
FIG. 5 is a table of nominal values for parameters associated with the second lens of FIG. 1, according to the first exemplary embodiment of the present invention.
Figure 6:
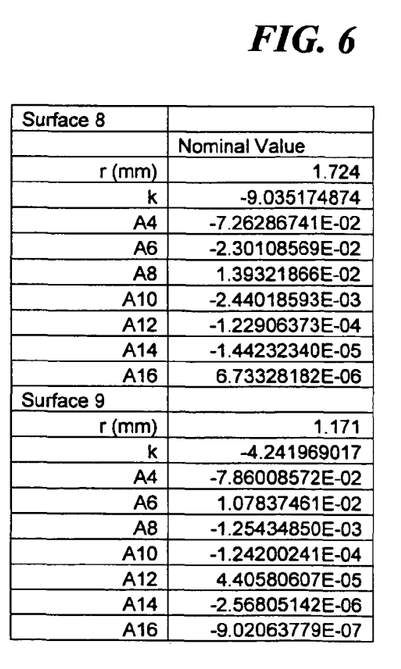
FIG. 6 is a table of nominal values for parameters associated with the fourth lens of FIG. 1, according to the first exemplary embodiment of the present invention.

Referring now to FIG. 2, a miniature camera 24 comprises a lens system 22 that focuses an image, such as from a scene or target 21, upon imager 12. Lens system 12 typically comprises a plurality of lenses that cooperate to mitigate undesirable distortions so as to form a well focused image. According to one or more embodiments of the present invention, lens system 22 comprises lenses 15-18 shown in FIG. 1 and discussed in detail herein.

Referring again to FIG. 1, the present invention can comprise four lenses as discussed above. Surface 1 is the aperture stop which is located immediately in front of first lens 15. As mentioned above, lenses 15, 16 and 18 can be plastic or glass aspheric lenses. Lens 17 can be a plano-convex glass spherical lens. As those skilled in the art will appreciate, configuring lens 17 to have one plano surface substantially reduces the cost thereof.

Exit window 19 can be a plano-plano glass element positioned in front of the imager. Exit window 19 can be omitted, if desired.

According to the two exemplary embodiments of the present invention, lenses 15 and 17 are can have positive power. Lenses 16 and 18 can have negative power. Lens 15 can have smallest clear aperture in the lens system 22. Lens 16 can have the second smallest clear aperture in the lens system 22. Lens 17 can have the third smallest clear aperture in the lens system 22. Lens 18 can have the largest clear aperture in the lens system 22.

Both exemplary embodiments of the present invention can be configured such that lenses 15 and 18 are comprised of the same material, which yields: $N_1=N_4$ and $v_1=v_4$.

Further, the following conditions are met:

$$0.2 \leq |N_3-N_1| \leq 0.25$$

$$0.15 \leq |N_3-N_2| \leq 0.19$$

$$0 \leq |N_2-N_1| \leq 0.1$$

$$23 \leq |v_1-v_2| \leq 29$$

$$20 \leq |v_3-v_2| \leq 25$$

$$0 \leq |v_3-v_1| \leq 10$$

where $N_1$, $N_2$, $N_3$ and $N_4$ are the refractive indices at the d line of lenses 15, 16, 17 and 18, respectively and $v_1$, $v_2$, $v_3$ and $v_4$ represent the Abbe numbers of lenses 15, 16, 17 and 18 respectively.

Both exemplary embodiments of the present invention can also fulfill the following conditions:

$$2.5 \leq F/\#4$$

$$0.5 \leq \frac{\sum d}{f} \leq 1.1$$

$$0.5 \leq \frac{f_1}{f} \leq 0.8$$

$$-0.8 \leq \frac{f_2}{f} \leq -0.6$$

$$0.9 \leq \frac{f_3}{f} \leq 1.3$$

$$-4.5 \leq \frac{f_4}{f} \leq -2$$

where F/#'s 1, 2, 3 and 4 are the f-numbers of lenses 15, 16, 17, 18 respectively, f represents the effective focal length of the invented lens systems, and $f_1$, $f_2$, $f_3$ and $f_4$ represent the effective focal length of lenses 15, lens 16, lens 17 and lens 18, respectively.

By constructing the lens system according to these equations, a smaller clear aperture can be provided. Thus, the lens system can fit within a smaller lens barrel and is thus suited for use in smaller miniature cameras.

Both exemplary embodiments of the present invention can also fulfill the condition:

$$\Sigma d=T_1+d_1+T_2+d_2+T_3+d_3+T_4$$

where $T_1$, $T_2$, $T_3$, and $T_4$ represent the center thicknesses of Lens 15, 16, 17 and 18 respectively; and $d_1$, $d_2$ and $d_3$ are the center distances between lens 15 and lens 16, lens 16 and lens 17, and lens 17 and lens 18.

Referring now to FIGS. 3-6, the parameters associated with lens 15-18 and their surfaces 2-9 for the first exemplary embodiment of the present invention are listed. As mentioned above, lenses 15, 16, and 18 are aspheric lenses.

Referring now to FIGS. 7-10, the optical characteristics of the first exemplary embodiment of the present invention are shown. These charts are the result of optically modeling the lens system 22 and then running simulations thereon.

Figure 7:
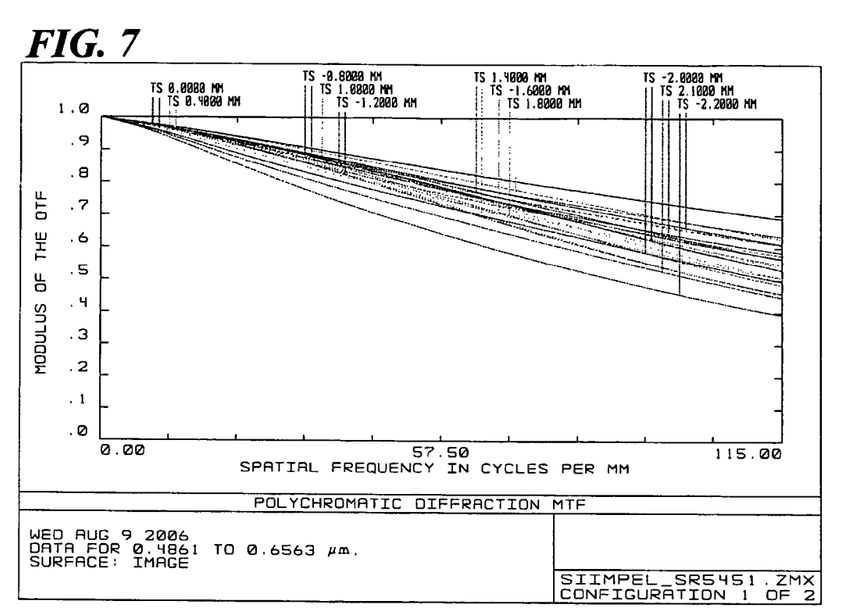
FIG. 7 is a chart showing the polychromatic diffraction modulation transfer function (MTF) of the first exemplary embodiment of the present invention, for an object at infinity.

With particular reference to FIG. 7, the polychromatic diffraction modulation transfer function (MTF) of the first exemplary embodiment of the present invention for an objection at infinity is shown. As can been seen, the MTF at a spatial frequency of 115 cycles per millimeter is from approximately 0.4 to approximately 0.7.

Figure 8:
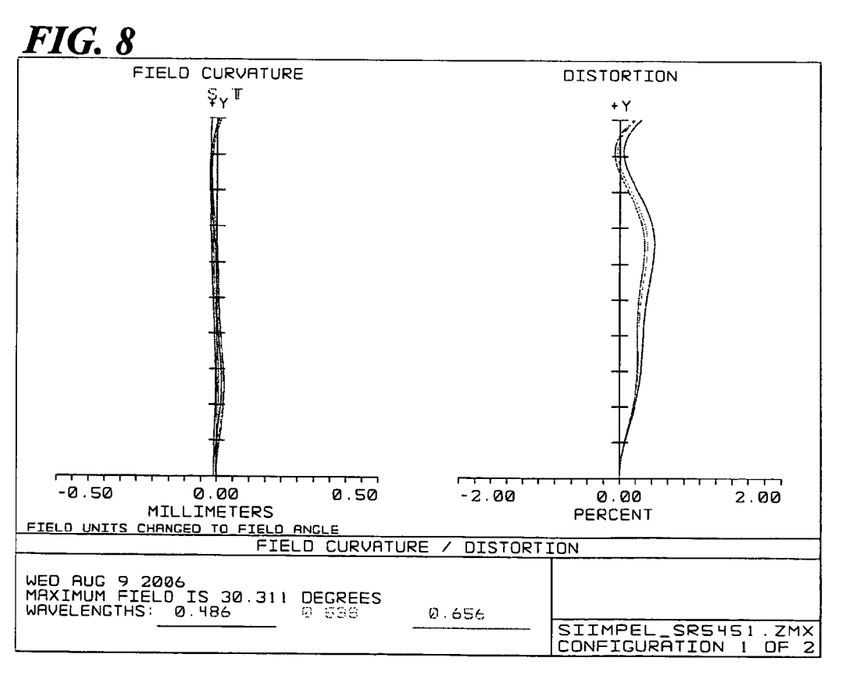
FIG. 8 is a chart showing the field curvature/distortion of the first exemplary embodiment of the present invention for an object at infinity.

With particular reference to FIG. 8, the field curvature and distortion for the first exemplary embodiment of the present for an object at infinity are shown. The maximum distortion is well within +/−1%.

Figure 9:
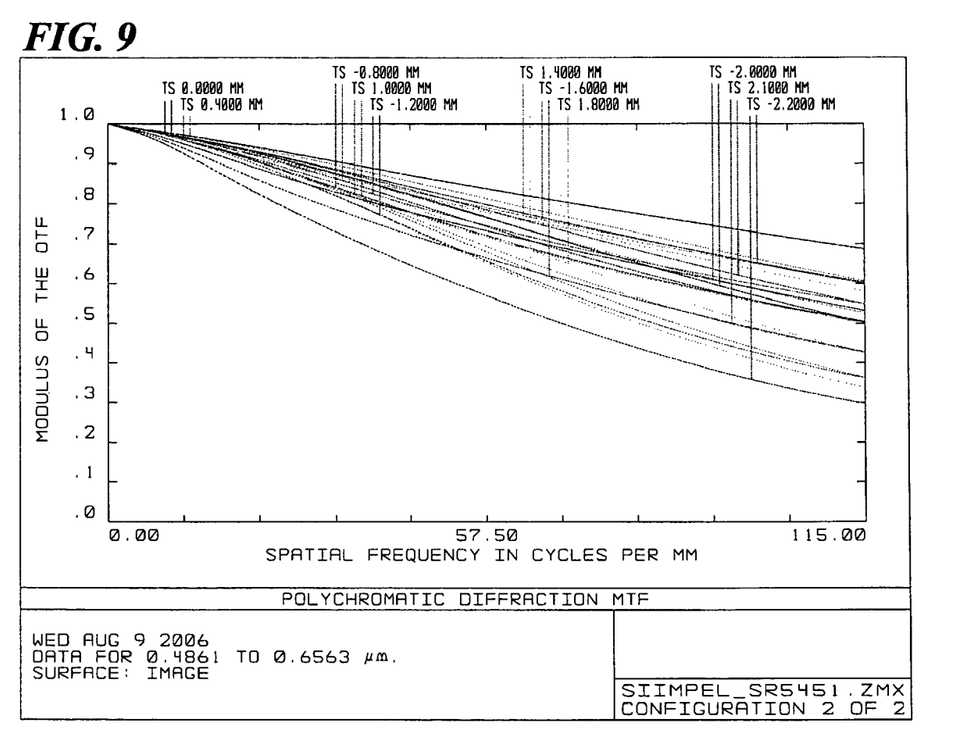
FIG. 9 is a chart showing the polychromatic diffraction modulation transfer function (MTF) of the first exemplary embodiment of the present invention for an object at 10 centimeters.

With particular reference to FIG. 9, the polychromatic diffraction modulation transfer function (MTF) of the first exemplary embodiment of the present invention for an object at 10 centimeters is shown. As can been seen, the MTF at a spatial frequency of 115 cycles per millimeter is from approximately 0.3 to approximately 0.7.

Figure 10:
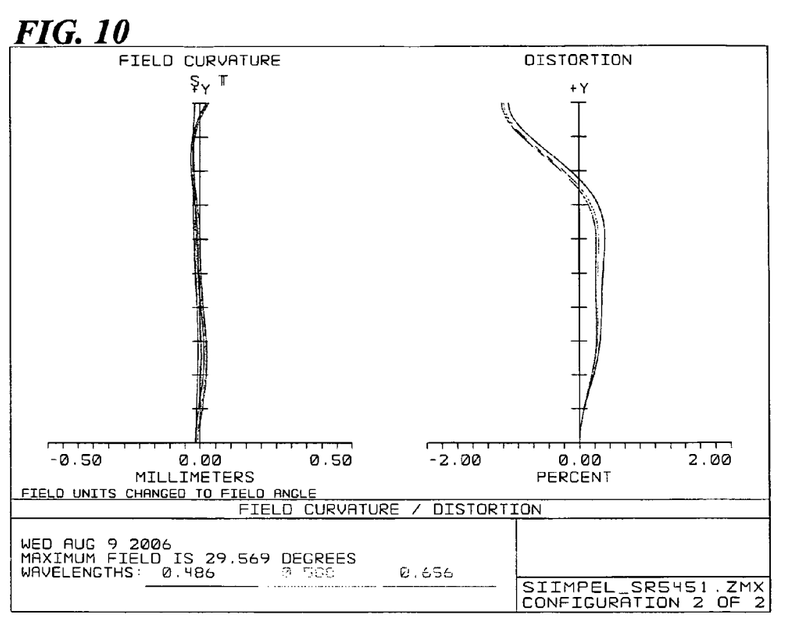
FIG. 10 is a chart showing the field curvature/distortion of the first exemplary embodiment of the present invention for an object at 10 centimeters.
Figure 11:
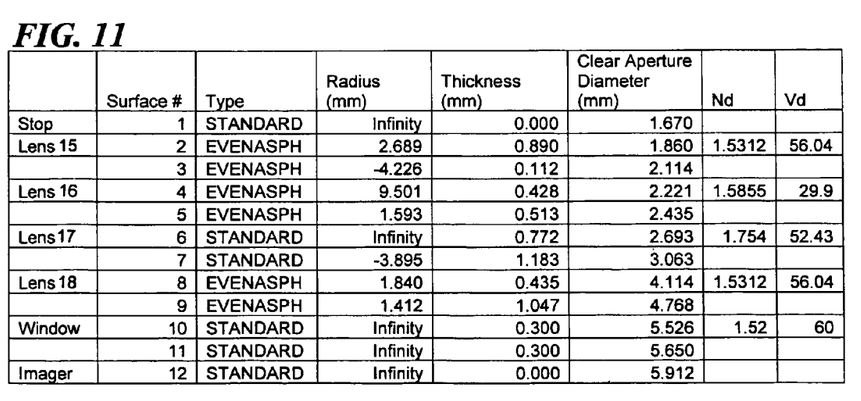
FIG. 11 is a table of lens parameters associated with the lenses of FIG. 1, according to a second exemplary embodiment of the present invention.

With particular reference to FIG. 10, the field curvature and distortion for the first exemplary embodiment of the present for an object at 10 centimeters are shown. The maximum distortion is well within +/−1%.

Referring now to FIGS. 11-14, the parameters associated with lenses 15-18 and their surfaces 2-9 for the second exemplary embodiment of the present invention are listed. Again, lenses 15, 16, and 18 are aspheric lenses.

Referring now to FIGS. 15-18, the optical characteristics of the second exemplary embodiment of the present invention are shown. These charts are again the result of optically modeling the lens system and then running simulations thereon.

Figure 15:
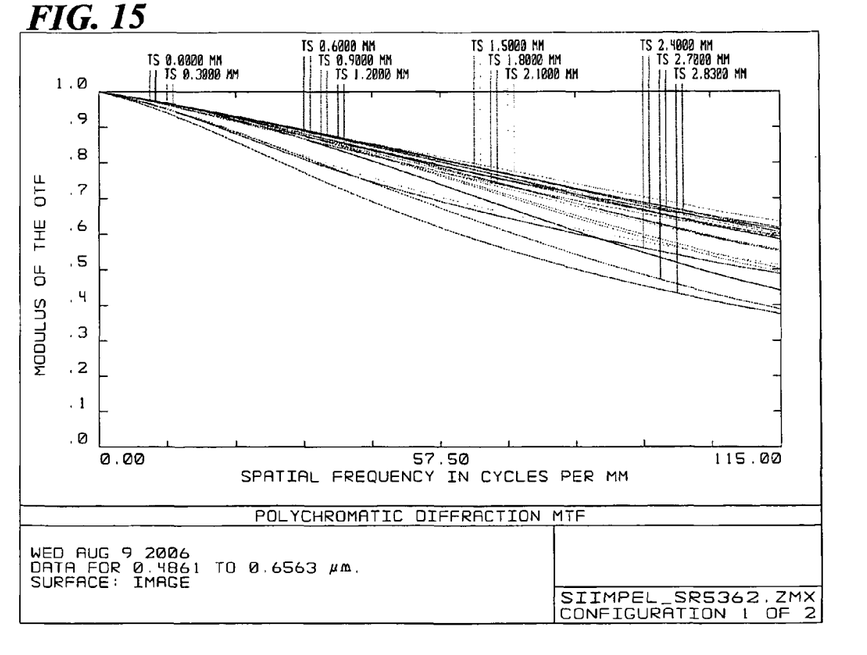
FIG. 15 is a chart showing the polychromatic diffraction modulation transfer function (MTF) of the second exemplary embodiment of the present invention, for an object at infinity.

With particular reference to FIG. 15, the polychromatic diffraction modulation transfer function (MTF) of the second exemplary embodiment of the present invention for an object at infinity is shown. As can been seen, the MTF at a spatial frequency of 115 cycles per millimeter is from approximately 0.38 to approximately 0.64.

Figure 16:
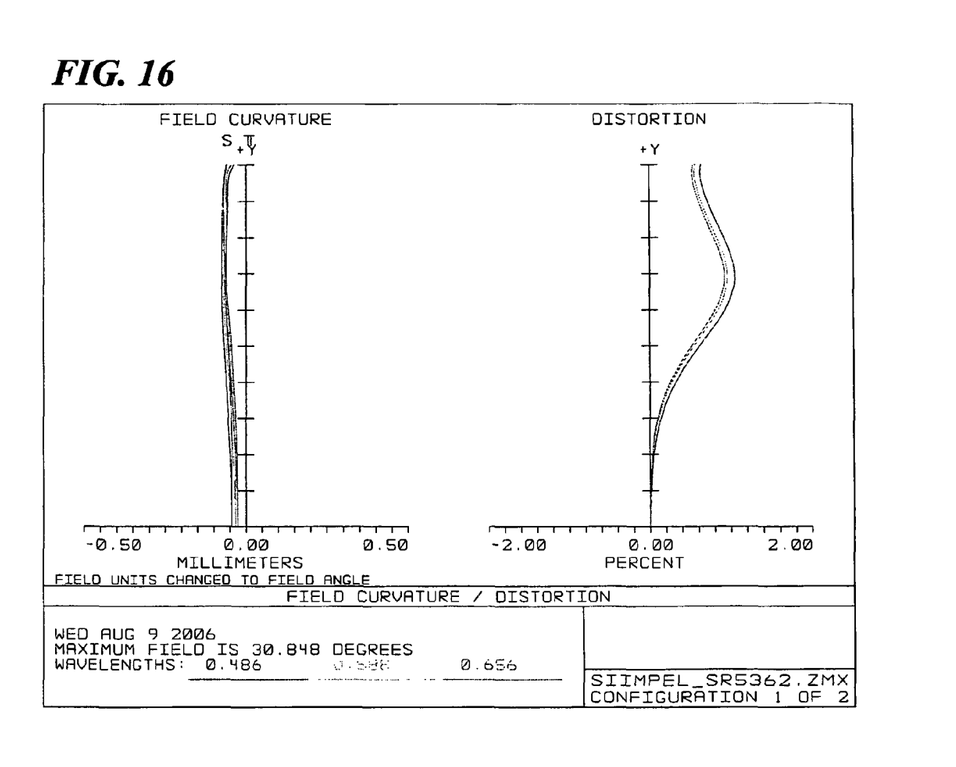
FIG. 16 is a chart showing the field curvature/distortion of the second exemplary embodiment of the present invention for an object at infinity.

With particular reference to FIG. 16, the field curvature and distortion for the second exemplary embodiment of the present for an object at infinity are shown. The maximum distortion is within approximately +/−1%.

Figure 17:
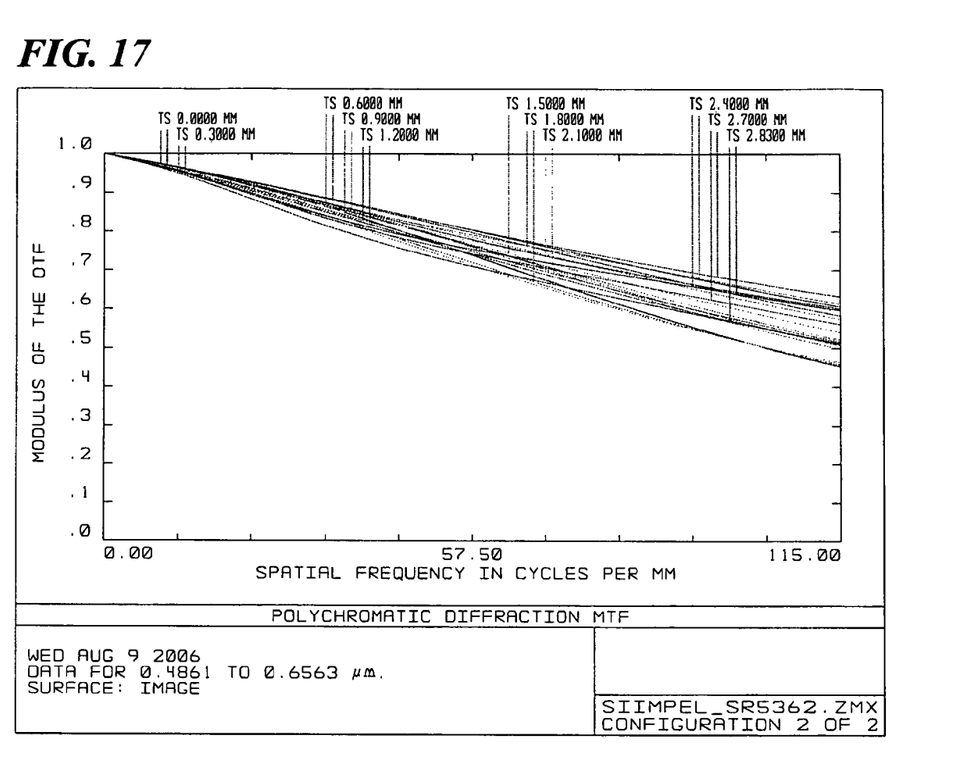
FIG. 17 is a chart showing the polychromatic diffraction modulation transfer function (MTF) of the second exemplary embodiment of the present invention for an object at 10 centimeters.

With particular reference to FIG. 17, the polychromatic diffraction modulation transfer function (MTF) of the first exemplary embodiment of the present invention for an object at 10 centimeters is shown. As can been seen, the MTF at a spatial frequency of 115 cycles per millimeter is from approximately 0.45 to approximately 0.63.

Figure 18:
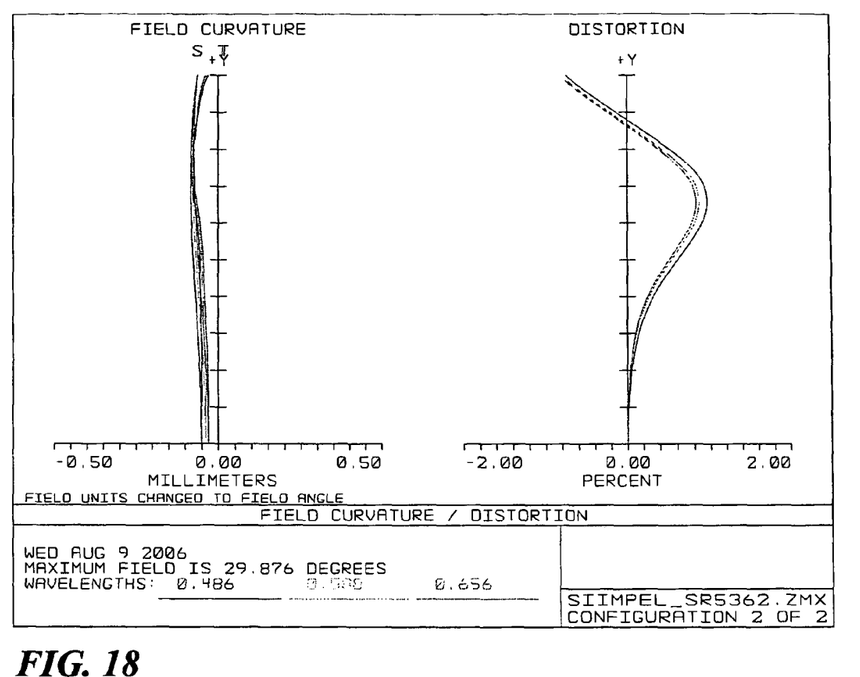
FIG. 18 is a chart showing the field curvature/distortion of the second exemplary embodiment of the present invention for an object at 10 centimeters.

With particular reference to FIG. 18, the field curvature and distortion for the second exemplary embodiment of the present for an object at 10 centimeters are shown. The maximum distortion is within approximately +/−1%.

An even aspheric surface can be defined as:

$$z = (y^2/r)/[1+\{1-(K+1)(y/r)^2\}^{1/2}] + A_4 y^4 + A_6 y^6 + A_8 y^8 + A_{10} y^{10} + A_{12} y^{12} + A_{14} y^{14} + A_{16} y^{16}$$

where z represents the coordinate in the direction of the optical axis, r is the curvature radius of the surface, y represents the radial distance from the optical axis, K represents a conic coefficient, and $A_4$, $A_6$, $A_8$, $A_{10}$, $A_{12}$, $A_{14}$ and $A_{16}$ represent spherical coefficients.

Figure 12:
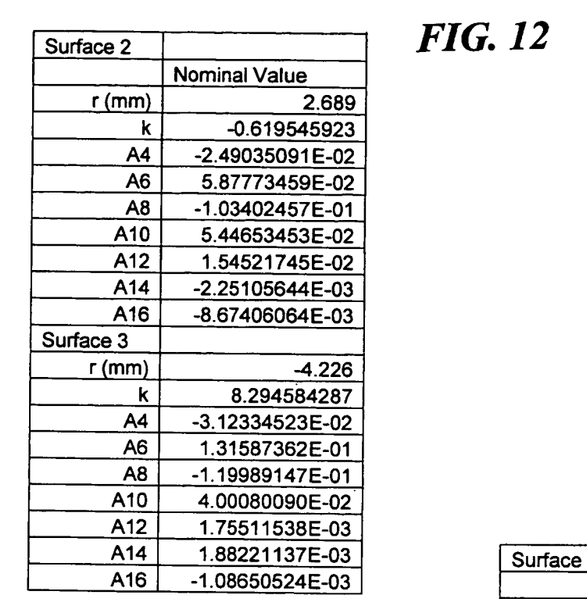
FIG. 12 is a table of nominal values for parameters associated with the first lens of FIG. 1, according to the second exemplary embodiment of the present invention.
Figure 13:
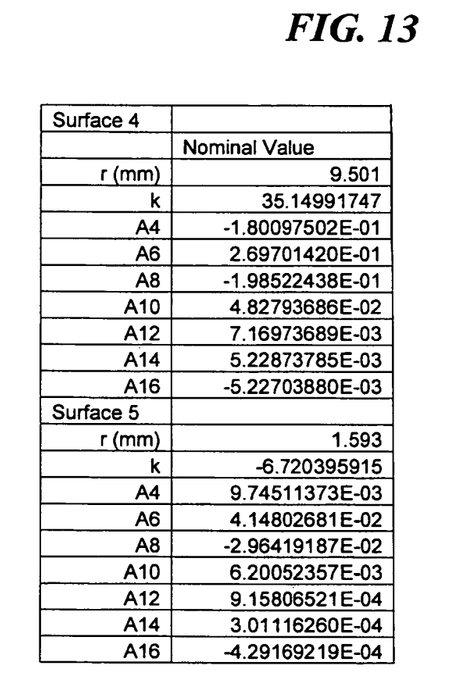
FIG. 13 is a table of nominal values for parameters associated with the second lens of FIG. 1, according to the second exemplary embodiment of the present invention.
Figure 14:
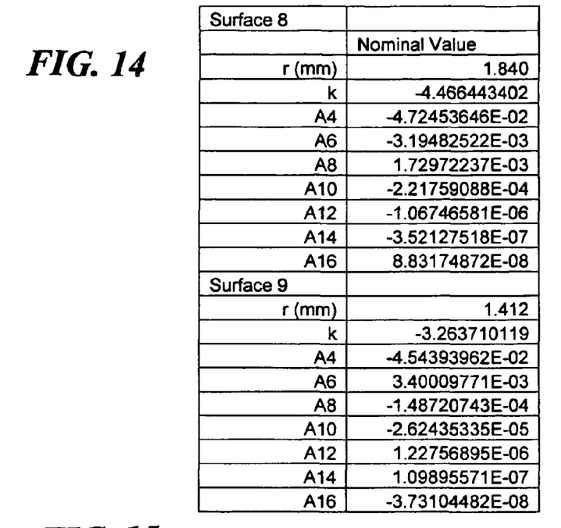
FIG. 14 is a table of nominal values for parameters associated with the fourth lens of FIG. 1, according to the second exemplary embodiment of the present invention.

The two even aspheric surfaces are defined as given in the charts of FIG. 2 (for the first exemplary embodiment of the present invention) and FIG. 12 (for the second exemplary embodiment of the present invention).

Figure 19:
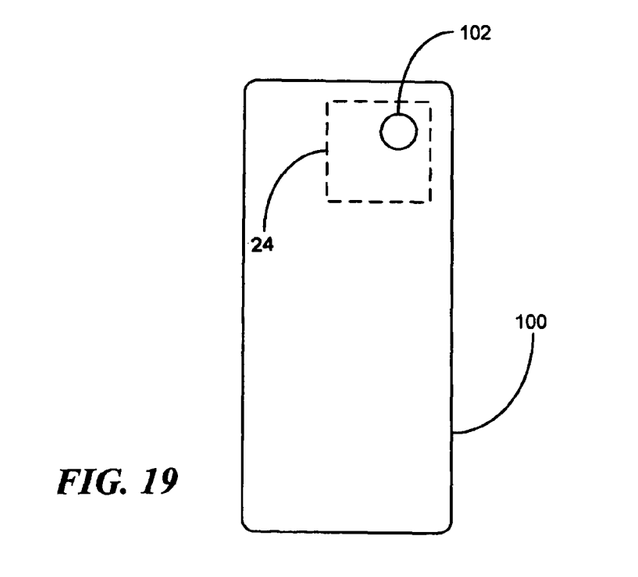
FIG. 19 is a semi-schematic illustration of a cellular telephone having a miniature camera according to an exemplary embodiment of the present invention.

Referring now to FIG. 19, a personal electronic device such as a cellular telephone 100 can have a miniature camera 24. Miniature camera 24 can have a lens system 22 (FIG. 2) constructed such that the size of entrance window 102 is substantially reduced. Reduction of the size of entrance window 102 can be desirable because such reduction tends to provide more room for other items such as a keypad, controls (such as buttons), and displays. Reduction of the size of entrance window 102 can also be desirable because such reduction tends to enhance the aesthetic appeal of the personal electronic device.

Further, reducing the size of the entrance window 102 can facilitate a corresponding reduction in the size of a shutter positioned proximate the window. Such a reduction in the size of the shutter can have benefits that include reduced cost, reduced mass (and therefore reduced inertia and faster movement), and reduced displacement of the moving parts (again resulting in faster movement). Thus, the shutter can be suitable for use at faster shutter speeds.

Thus, according to one or more embodiments of the present invention, the use of a smaller entrance window for the personal electronic device is facilitated. Further, the overall size of the lens system is reduced and the lens system can desirably have four lenses such that distortion is mitigated and resolution is enhanced.

Embodiments described above illustrate, but do not limit, the invention. It should also be understood that numerous modifications and variations are possible in accordance with the principles of the present invention. Accordingly, the scope of the invention is defined only by the following claims.

The invention claimed is:

1. A lens system for a miniature camera, the lens system comprising:
    an imager; and,
    four cylindrical lenses disposed concentrically on an optical axis of the lens system and including, in order from a front end of the lens system to a back end of the lens system, a first lens, a second lens, a third lens and a fourth lens, wherein:
        each of the lenses has opposite front and back surfaces;
        the first lens has a positive power and aspheric front and back surfaces;
        the second lens has a negative power and aspheric front and back surfaces;
        the third lens is made of glass, has a positive power, a plano front surface and a spherical convex back surface; and,
        the fourth lens has a negative power and aspheric front and back surfaces.

2. The lens system as recited in claim 1, wherein the respective diameters of the lenses increase from front to back of the lens system.

3. The lens system as recited in claim 1, wherein each successive lens has a larger diameter that the preceding lens.

4. The lens system as recited in claim 1, wherein the lenses are configured such that a first lens and a fourth lens are comprised of the same material such that $N_1 = N_4$ and $v_1 = v_4$.

5. The lens system as recited in claim 1, wherein the lenses comprise four lenses that are configured such that:

$$0.2 \leq |N_3 - N_1| \leq 0.25;$$

$$0.15 \leq |N_3 - N_2| \leq 0.19;$$

$$0 \leq |N_2 - N_1| \leq 0.1;$$

$$23 \leq |v_1 - v_2| \leq 29;$$

$$20 \leq |v_3 - v_2| \leq 25;$$

$$0 \leq |v_3 - v_1| \leq 10; \text{ and,}$$

wherein $N_1$, $N_2$, $N_3$ and $N_4$ are the refractive indices at the d line of the first, second, third, and fourth lenses, respectively and $v_1$, $v_2$, $v_3$ and $v_4$ represent the Abbe numbers of the first, second, third, and fourth lenses, respectively.

6. The lens system as recited in claim 1, wherein the lenses comprise four lenses that are configured such that:

$2.5 \leq F/\# \leq 4$;

$0.5 \leq \Sigma d/f \leq 1.1$;

$0.5 \leq f_1/f \leq 0.8$;

$-0.8 \leq f_2/f \leq -0.6$;

$0.9 \leq f_3/f \leq 1.3$;

$-4.5 \leq f_4/f \leq -2$; and, wherein F/# is the f-number of the lens system and $f_1$, $f_2$, $f_3$ and $f_4$ represent the effective focal length of a first, second, third, and fourth lens, respectively.

7. The lens system for the miniature camera of claim 1 wherein the imager has a diameter of about 0.25 mm to about 1/3.2 mm.

8. A miniature camera incorporating the lens system of claim 1.

9. A cellular telephone incorporating the miniature camera of claim 7.

* * * * *

UNITED STATES PATENT AND TRADEMARK OFFICE
CERTIFICATE OF CORRECTION

PATENT NO. : 7,785,023 B1
APPLICATION NO. : 11/505660
DATED : August 31, 2010
INVENTOR(S) : Jing Xu It is certified that error appears in the above-identified patent and that said Letters Patent is hereby corrected as shown below:

In column 6, please delete lines 5 thru 15, and insert instead:
$0.2 \leq |N3 - N1| \leq 0.25;$
$0.15 \leq |N3 - N2| \leq 0.19;$
$0 \leq |N2 - N1| \leq 0.1;$
$23 \leq |v1 - v2| \leq 29;$
$20 \leq |v3 - v2| \leq 25;$
$0 \leq |v3 - v1| \leq 10$
--.

In column 6, please delete line 22, and insert instead:
-- $2.5 \leq F/\# \leq 4$ --.

In column 8, please delete lines 55 thru 65, and insert instead:
$0.2 \leq |N3 - N1| \leq 0.25;$
$0.15 \leq |N3 - N2| \leq 0.19;$
$0 \leq |N2 - N1| \leq 0.1;$
$23 \leq |v1 - v2| \leq 29;$
$20 \leq |v3 - v2| \leq 25;$
$0 \leq |v3 - v1| \leq 10;$
-- and,--.

In column 9, please delete lines 5 thru 14, and insert instead:
$2.5 \leq F/\# \leq 4$
$0.5 \leq \Sigma d/f \leq 1.1;$
$0.5 \leq f1/f \leq 0.8;$
$-0.8 \leq f2/f \leq -0.6;$
$0.9 \leq f3/f \leq 1.3;$ --.

In column 10, please delete line 1, and insert instead:
-- $-4.5 \leq f4/f \leq -2$; and,--.

In column 4, lines 48 and 49, change "telephone phones" to --telephones--.

In column 6, line 43, change "lenses 15" to --lens 15--.

Signed and Sealed this

Thirtieth Day of November, 2010

David J. Kappos
*Director of the United States Patent and Trademark Office*

In column 6, line 55, change "Lens 15, 16," to --lenses 15, 16,--.

In column 6, line 59, change "lens 15-18" to --lenses 15-18--.

In column 7, line 6, after the word "present" insert --invention--.

In column 7, line 16, after the word "present" insert --invention--.

In column 7, line 46, after the word "present" insert --invention--.

In column 8, line 49, change the word "that" to --than--.